United States Patent Office 3,761,383
Patented Sept. 25, 1973

3,761,383
PACKED BED ELECTROCHEMICAL CELL IN-
CLUDING PARTICULATE BIPOLAR ELEC-
TRODES SEPARATED BY NON-CONDUCTING
PARTICLES
John Rayner Backhurst, Corbridge, Francis Goodridge,
Ponteland, Martin Fleischmann, Eastleigh, and John
Wilfred Oldfield, Sutton Coldfield, England, assignors
to National Research Development Corporation, London, England
Filed Sept. 27, 1971, Ser. No. 184,001
Claims priority, application Great Britain, Sept. 28, 1970,
45,999/70
Int. Cl. B01k 3/00
U.S. Cl. 204—268    11 Claims

ABSTRACT OF THE DISCLOSURE

A packed bed type of electrochemical cell comprises a large number of isolated conducting units separated by non-conducting means, the bed being arranged between two electrodes and electrolyte made to flow through the bed. In consequence the cell, in operation, comprises a multiplicity of small bipolar cells distributed throughout the bed.

Figure 1:
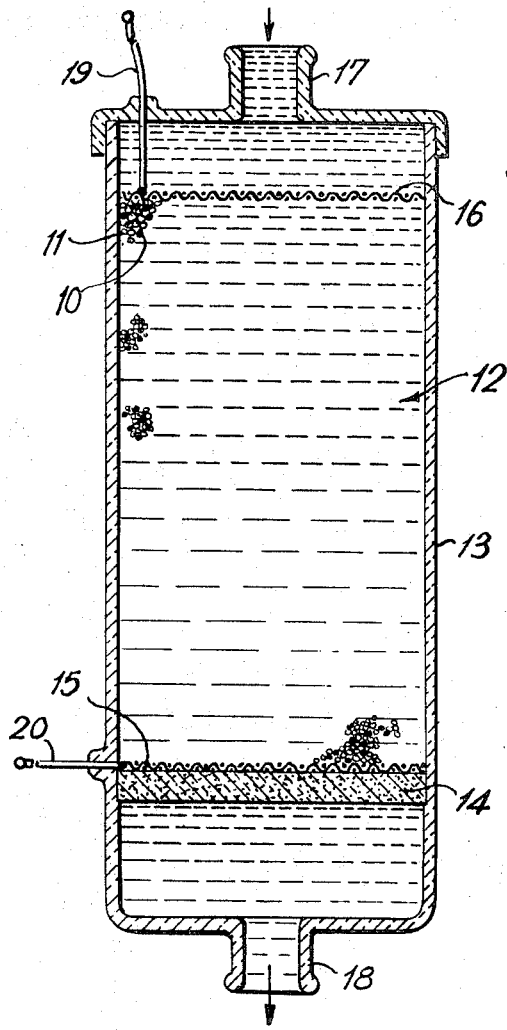

The bed may be cylindrical or rectangular or of any desired form and may comprise a mixture of conducting and non-conducting particles. If the particles are of similar size or size distribution, then about twice the quantity (volume) of non-conducting particles as conducting particles are probably required.

---

This invention relates to electrochemical cells, and in particular to cells to which we refer herein as of the packed bed type of cell, an object of the invention being to provide improved forms of such cells.

Levtsevich and Sergunina in Gigiena i Sanitariya 33 (9), 22–27, 1968 have described a packed bed cell in which a bed of magnetite particles is arranged between current conducting electrodes in a suitable chamber containing electrolyte. In these cells, the particles, being conductive, act to provide a number of independent bipolar units when a voltage gradient exists between the current carrying electrodes, and these bipolar units in effect provide a multiplicity of small cells throughout the bed.

We have found that in this type of cell a degree of control can be introduced by providing for isolation of at least some of the bipolar units from each other.

In accordance with the invention we provide a packed bed type of cell in which in operation a large number of isolated bi-polar cells is created throughout the bed.

Thus the cell may comprise a bed of conducting particles at least a high proportion of which are separated from each other by non-conducting means, such as by being mixed with non-conducting particles. If particles are used for the separation and each kind of particle, conducting and non-conducting, is of substantially the same size, or size range, then it is preferred that there should be approximately twice the quantity (by volume) or non-conducting particles as conducting particles. The conducting particles will thus tend to form discrete bipolar units distributed throughout the bed. It is not essential that the two lots of particles should be of the same order of size; if they are different, however, it is preferred that the non-conducting particles are the smaller. The particles may moreover be of any convenient shape, but spherical particles are preferred.

The flow of the electrolyte, with or without other reactant fluid, through the bed may be in the same direction as the voltage gradient, i.e. current flow, or it may be at an angle, even at right angles, to the direction of current flow. The result, in any case, is that the cell reaction begins to occur at each end (the cell will be polarised in the direction of current flow) of each particulate bipolar unit as soon as the applied voltage field has increased to such strength as will cause the voltage of each small cell to drive the required reaction. As the field increases still further an optimum field strength is reached corresponding to a minimum applied voltage for a given quantity of product of the reaction.

Thus the required bipolar unit voltage determines the necessary applied field for a given particle size but the current through the cell is determined by the conductivity of the electrolyte. In turn the magnitude of the current determines the current efficiency of the cell since this current is independent of the species present and only dependent on the total conductivity. There is, however, an upper limit to the conductivity of the electrolyte which can be used; this is determined by the extent to which the system can tolerate Joule heating. In practice, when applied fields of 10 to 100 volts/cm. are necessary, electrolyte concentrations of $10^{-2}$ to $10^{-4}$ moles per litre will be found to be satisfactory.

Figure 2:
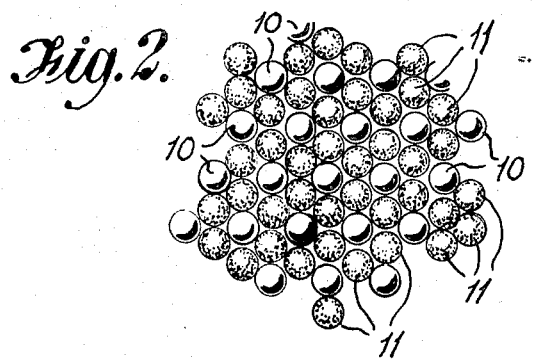

One specific examples of packed bed cell in accordance with the invention will now be described with reference to the accompanying diagrammatic drawings of which FIG. 1 shows a vertical section through the cell and FIG. 2, an enlarged detail, somewhat idealised, of a portion of the bed.

In the drawings, carbon or graphite particles 10 of approximately 500 microns diameter, or similarly sized glass beads, such as ballotini glass spheres, coated with graphite, are thoroughly mixed, for example by agitation, with twice their volume of non-conducting glass beads 11 of the same size (See FIG. 2) and the mixture is packed into a column 12 which is 4.5 cm. long and 5 sq. cm. cross-sectional area contained within a reaction chamber 13. Alternatively, metal or metal-coated beads can be used. The column is supported on a porous glass plate 14 on top of which is seated a 36 gauge platinum gauze electrode 15 and a similar electrode 16 is in engagement with the top of the column. It is not essential that all the conducting particles should be isolated from each other but it is preferable that as many discrete, isolated, bipolar units are formed as is reasonably possible. Terminals 19 and 20 are provided for connecting the electrodes to a suitable electrical supply. Ducts 17 and 18 are provided for the flow of electrolyte solution and the cell is shown as for a reaction in which the solution flows downwardly as indicated by the arrows at the top and bottom of the cell. The porous plate 14 which is preferably a so-called, glass sinter, ensures good distribution of flow.

A cell such as that described above by way of example may be used advantageously for a partial oxidation of a bromide solution, and in accordance with an aspect of the invention the product of such oxidation operation is used to oxidise propylene to propylene oxide. In this reaction the solution is preferably arranged to flow downwards.

Thus, if a solution, even as dilute as containing only $10^{-2}$ mol. sodium bromide, is pumped down the column at a rate of 600 cc. per minute with 350 volts applied across the platinum electrodes, the resulting current is 180 ma. which means that 63 watts can be consumed. The solution flowing out of the base of the column contains $1.21 \times 10^{-3}$ mol. bromine; because dilute $Br^-$ solutions favour $BrO^-$ production $(Br_2 + OH^- = BrO^- + HBr)$, the bromine is analysed as $BrO^-$ by potentiometric titration with ferrocyanide.

Comparing the results achieved using this particular cell with those obtained with a planar electrode cell working under diffusion-controlled conditions, it is found that the particulate column cell is equivalent to something of the order of 10 such planar electrode cells per centimetre length of the bed with typically 5–10 volts per cell, the current efficiency of each cell being taken to be about 40%. The amount of bromine produced from low concentration solution per unit volume of the new cell is comparable therefore to that produced in a conventional cell at high concentration.

Thus in a conventional cell with plane parallel electrodes, a larger current would have to be supplied (at a lower total voltage) to produce the same amount of bromine; moreover, the electrolyte concentration would have to be correspondingly greater to allow this current to be achieved and the advantages of working in dilute solutions would be lost. Thus, assuming (i) even 100% current efficiency, (ii) an inter-electrode spacing of 1.1 cm. and (iii) an identical cell volume, the concentration of sodium bromide would have to be approximately 0.1 mol. to permit a comparable amount of bromine to be formed for a similar expenditure of power. The current would be 0.9 a. and the cell voltage 19 volts.

For particular uses of the cell described in accordance with the invention, it may be desirable, and even advantageous, to compress the bed preferably only when the cell is in operation. Such compression may be effected by exerting pressure on an electrode in contact with one face of the bed, such as on the upper electrode or the bed may be pre-compressed before this electrode is introduced.

Although the particular cell described uses particles, conducting and non-conducting, of comparable size, it may be found convenient to use non-conducting particles of different size. If they are much smaller than the conducting particles it may be necessary to arrange for at least some of them to be prefixed in relation to at least some of the conducting particles by, for example, attaching a number of the non-conducting particles to each larger one by a coating process. Other means will be apparent to those skilled in the art.

In an alternative embodiment of the invention the cell is of rectangular horizontal cross-section. Each electrode comprises a carbon plate, approximately 10 cm. x 6 cm., associated with one of the side walls of the cell, the other electrode comprising a further carbon plate of about the same size associated with the other side wall of the cell. The two plates are arranged vertically and are approximately 4 cm. apart. Current-carrying leads are brought out of the cell for the electrodes and means are provided at top and bottom of the cell for flow of electrolyte through the cell. A packed bed of mixed conducting and non-conducting particles is arranged to rest upon a porous plate between the electrodes so as to distribute the flow. It will be noted that in this case the flow of electrolyte is at right angles to the electric field that arises between the two electrodes.

A cylindrical cell can be made to operate with its electric field at right angles to the flow through the cell by providing a cylindrical outer electrode which contains a packed bed of conducting and non-conducting particles supported by a porous base, the other electrode being rod-like, extending along the axis of the cylindrical electrode, and passing through the centre of the packed bed.

We claim:
1. A packed bed type of electrochemical cell comprising a packed bed consisting essentially of a plurality of conducting particles and a greater number of non-conducting particles randomly distributed throughout said conducting particles to permit of discrete isolation of a number of said conducting particles from each other in the mass of non-conducting particles, said cell, in operation, providing a large number of isolated bipolar cells throughout said packed bed.
2. A packed bed type of cell as claimed in claim 1, wherein both the conducting particles and the non-conducting particles are of similar size, the quantity (by volume) of the non-conducting particles being approximately twice that of the conducting particles.
3. A packed bed type of cell as claimed in claim 1, wherein the conducting particles are of carbon or graphite.
4. A packed bed type of cell as claimed in claim 1, wherein the non-conducting particles are glass spheres.
5. A packed bed type of cell as claimed in claim 4, wherein said glass spheres are glass ballotini.
6. A packed bed type of cell as claimed in claim 1, wherein the conducting particles are glass spheres coated with conducting materials.
7. A packed bed type of cell as claimed in claim 6, wherein the glass spheres are coated with carbon.
8. A packed bed type of cell as claimed in claim 1, wherein at least some non-conducting particles are attached to at least some individual conducting particles before assembly of the bed.
9. A packed bed type of cell as claimed in claim 1, wherein the bed of particles is compressed together.
10. A packed bed type of cell as claimed in claim 9, wherein the bed of particles is compressed by pressure exerted on an electrode in contact with one face of the bed.
11. A packed bed type of cell as claimed in claim 1, wherein the bed of particles is arranged to be compressed only during operation of the cell.

References Cited
UNITED STATES PATENTS
| | | | |
|---|---|---|---|
| 3,616,356 | 10/1971 | Roy | 204—152 |
| 3,654,098 | 4/1972 | Backhurst et al. | 204—222 |
| 3,335,078 | 8/1967 | Mehl | 204—268 |

FOREIGN PATENTS
| | | | |
|---|---|---|---|
| 1,500,269 | 11/1967 | France | 204—Dig. 10 |

OTHER REFERENCES
Le Goff, P. et al.: "Applications of Fluidized Beds in Electrochemistry," Industrial and Engineering Chemistry (vol. 61, No. 10), October 1969, pp. 8–17.

JOHN H. MACK, Primary Examiner

W. I. SOLOMON, Assistant Examiner

U.S. Cl. X.R.

204—95